United States Patent
Nishimura et al.

(10) Patent No.: US 6,907,171 B2
(45) Date of Patent: Jun. 14, 2005

(54) OPTICAL FIBER COMPOSITE AND OPTICAL FIBER CABLE AND PRODUCTION METHOD THEREOF

(75) Inventors: Masayuki Nishimura, Yokohama (JP); Shigeru Tanaka, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 10/893,968

(22) Filed: Jul. 20, 2004

(65) Prior Publication Data

US 2004/0264900 A1 Dec. 30, 2004

Related U.S. Application Data

(63) Continuation of application No. 10/041,585, filed on Jan. 10, 2002, now Pat. No. 6,769,822.

(30) Foreign Application Priority Data

Feb. 2, 2001 (JP) ............................. 2001/27217

(51) Int. Cl.[7] ............................................ G02B 6/16
(52) U.S. Cl. ......................... 385/123; 385/95; 385/24
(58) Field of Search ..................... 385/24, 122–124, 385/95

(56) References Cited

U.S. PATENT DOCUMENTS

| | | | |
|---|---|---|---|
| 5,277,730 A | | 1/1994 | Darsey et al. |
| 5,430,822 A | * | 7/1995 | Shigematsu et al. ....... 385/123 |
| 5,778,128 A | * | 7/1998 | Wildeman ................. 385/123 |
| 5,894,537 A | | 4/1999 | Berkey et al. |
| 6,421,484 B2 | | 7/2002 | Tanaka et al. |
| 6,487,005 B2 | * | 11/2002 | Georges et al. ......... 359/337.5 |

FOREIGN PATENT DOCUMENTS

| | | |
|---|---|---|
| EP | A1 0 590 633 | 4/1994 |
| EP | A2 0 790 510 | 6/1997 |
| WO | WO 00/42720 | 7/2000 |

OTHER PUBLICATIONS

T. Naito, et al., "1 Terabit/s WDM Transmission over 10,000 km," ECOC'99, PD2–1, 1999 (prior Art cited in the Specification).

Relating U.S. Appl. No. 09/736,236, filed Dec. 15, 2000, Docket No.: 50212–164. Title of the Invention: Optical Fiber Transmission Line and Optical Cable Including the Same, Now U.S. 6,421,484.

* cited by examiner

Primary Examiner—Kaveh Kianni
Assistant Examiner—Michael P. Mooney
(74) Attorney, Agent, or Firm—McDermott Will & Emery LLP

(57) ABSTRACT

An optical fiber composite that can easily have a desired mean transmission property as a whole even after a length of optical fiber is cut off from one end or both ends, a cable comprising the composites, and methods for producing the composite and cable. An optical fiber composite 10 is produced by splicing a first optical fiber 11, a second optical fiber 12, and a third optical fiber 13 in this order. The first optical fiber 11 and the third optical fiber 13 each have a first chromatic dispersion, $D_1$, at the wavelength of a signal-carrying lightwave. The second optical fiber 12 has a second chromatic dispersion, $D_2$, at the wavelength of the signal-carrying lightwave. The third optical fiber has a length, $L_3$, shorter than the length, $L_1$, of the first optical fiber. It is desirable that the ratio $L_3/L_1$ be at most 0.1.

8 Claims, 6 Drawing Sheets

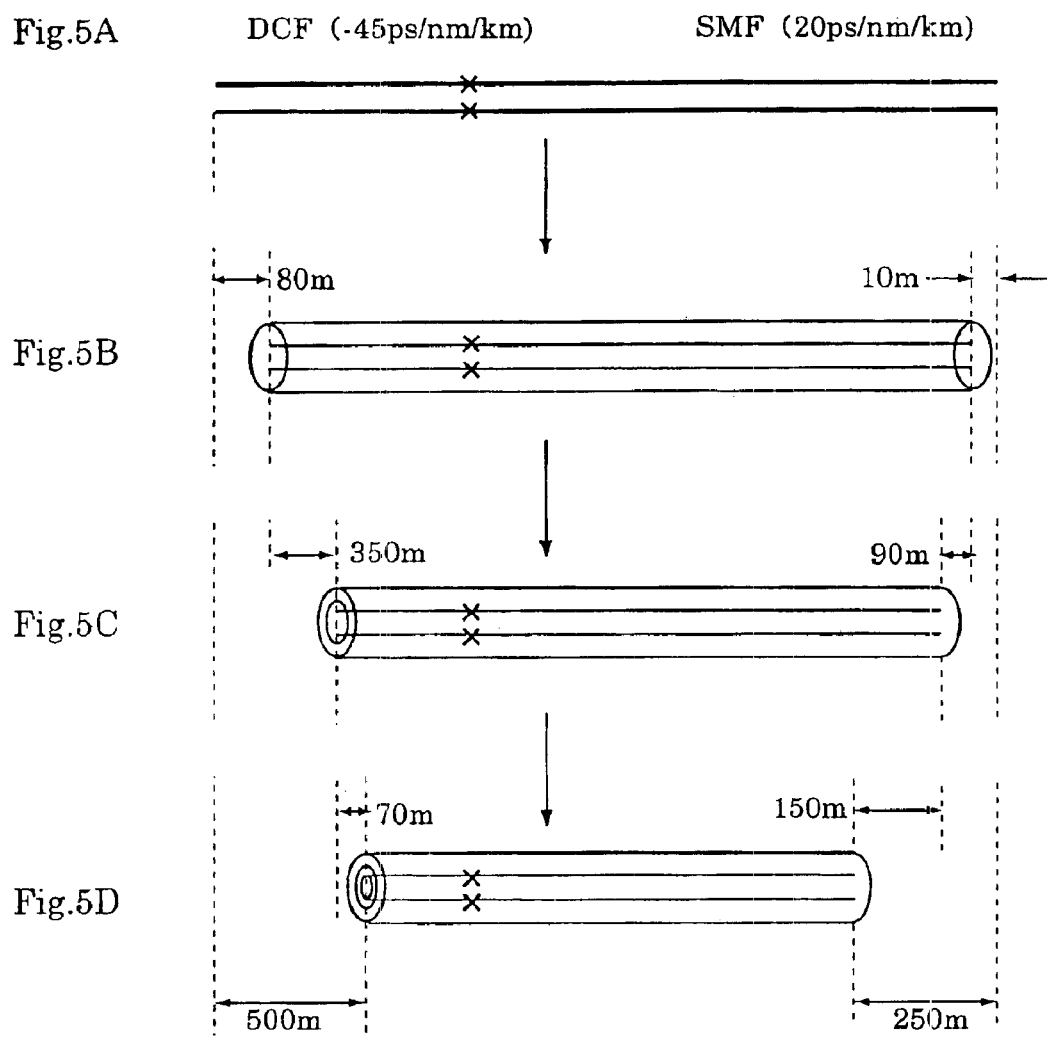

OPTICAL FIBER COMPOSITE AND OPTICAL FIBER CABLE AND PRODUCTION METHOD THEREOF

This application is a continuation of application Ser. No. 10/041,585, filed on Jan. 10, 2002, now U.S. Pat. No. 6,769,822.

BACKGROUND OF THE INVENTION

1. Field of the Invention

The present invention relates to an optical fiber composite in which two types of optical fibers having a chromatic dispersion opposite in sign to each other at the wavelength of a signal-carrying lightwave are spliced in cascade, an optical fiber cable comprising a plurality of the optical fiber composites, and methods for producing the optical fiber composite and the optical fiber cable.

2. Description of the Background Art

Optical wavelength division multiplexing (WDM) transmission systems enable large-capacity optical communication by using a plurality of wavelengths. Optical fiber transmission lines to be installed in the repeater sections of a WDM transmission system are required to have an excellent transmission property in the wavelength band of the signal-carrying lightwave, for example, a 1.55 $\mu$m-wavelength band. In order to meet this requirement, researchers and engineers have proposed optical fiber transmission lines having an ununiform transmission property along the length of the transmission line.

For example, a first literature (T. Naito, et al., "1 Terabit/s WDM Transmission over 10,000 km," ECOC '99, PD2-1, 1999) states an optical fiber transmission line consisting of the first optical fiber placed at the upstream side and the second optical fiber placed at the downstream side in terms of the propagation direction of a signal. The first optical fiber has a positive chromatic dispersion and a relatively large mode-field diameter at a 1.55-$\mu$m-wavelength band. The second optical fiber, a dispersion-compensating optical fiber (DCF), has a negative chromatic dispersion and a relatively small mode-field diameter at a 1.55-$\mu$m-wavelength band.

With this optical fiber transmission line, although a signal-carrying lightwave is intense when it starts to propagate in the first optical fiber, nonlinear optical phenomena seldom occur because the first optical fiber has a relatively large mode-field diameter. The lightwave decreases its intensity during the propagation through the first optical fiber. Because the lightwave with decreased intensity propagates through the second optical fiber, nonlinear optical phenomena seldom occur despite the second optical fiber having a relatively small mode-field diameter. In addition, because the two optical fibers have a chromatic dispersion opposite in sign to each other, a proper selection of the ratio of the lengths between the two optical fibers enables the overall chromatic dispersion of the entire optical fiber transmission line to be nearly zero. As described above, signal degrading due to the generation of nonlinear optical phenomena and a large value of overall chromatic dispersion can be avoided by using an optical fiber transmission line in which the first optical fiber and the second optical fiber are spliced in cascade in terms of the propagation direction of a signal-carrying lightwave.

A second literature, U.S. Pat. No. 5,894,537 entitled "Dispersion Managed Optical Waveguide," discloses an optical fiber transmission line in which a section having a positive chromatic dispersion at the wavelength band of a signal-carrying lightwave and another section having a negative chromatic dispersion at the same wavelength band are provided alternately and successively in the longitudinal direction. Because both sections are designed to have a large absolute value in chromatic dispersion, the occurrence of nonlinear optical phenomena such as four-wave mixing can be suppressed. Furthermore, because the overall chromatic dispersion of the entire optical fiber transmission line is designed to be small in absolute value, the degradation in the transmission quality can be suppressed.

SUMMARY OF THE INVENTION

An object of the present invention is to offer an optical fiber composite easily provided with a desired transmission property as a whole even after a length of optical fiber is cut off from one or both ends, an optical fiber cable comprising the optical fiber composites, and methods for producing the optical fiber composite and the optical fiber cable.

In order to achieve this object, the present invention offers an optical fiber composite in which the following three optical fibers are spliced in cascade in this order:

(a) the first optical fiber having a first chromatic dispersion, $D_1$, at the wavelength of a signal-carrying lightwave;

(b) the second optical fiber having a second chromatic dispersion, $D_2$, at the wavelength of the signal-carrying lightwave, with the second chromatic dispersion having the sign opposite to that of $D_1$; and (c) the third optical fiber that has the same chromatic dispersion, $D_1$, as the first optical fiber at the wavelength of the signal-carrying lightwave and that is shorter than the first optical fiber.

The optical fiber composite is produced by the following steps:

(a) determining the length, $L_2$, of the second optical fiber by using the following parameters:
   the chromatic dispersion, $D_1$, of the first and third optical fibers;
   the chromatic dispersion, $D_2$, of the second optical fiber;
   the designed length, $L_t$, of the optical fiber composite; and
   the designed mean chromatic dispersion, $D_m$, of the optical fiber composite;

(b) splicing the second optical fiber, having the length $L_2$, to one end of the first optical fiber and splicing the third optical fiber to the free end of the second optical fiber; and (c) cutting off a length of optical fiber from at least one free end of the first and third optical fibers so that the total length of the optical fiber composite can be adjusted to the designed length, $L_t$, with the third optical fiber being shorter than the first optical fiber.

In an embodiment of the above-described optical fiber composite; the ratio of the length, $L_3$, of the third optical fiber to the length, $L_1$, of the first optical fiber ($L_3/L_1$) may be 0.1 or less; or the length, $L_3$, of the third optical fiber may be 1 km or less. Furthermore, the absolute value of the chromatic dispersion $D_2$ may be larger than that of chromatic dispersion $D_1$.

The optical fiber cable of the present invention is a bundle of a plurality of the above-described optical fiber composites and is produced by the following steps:

(a) determining the length, $L_2$, of the second optical fiber by using the following parameters:
   the chromatic dispersion, $D_1$, of the first and third optical fibers;

the chromatic dispersion, $D_2$, of the second optical fiber;

the designed length, $L_t$, of the optical fiber composite; and the designed mean chromatic dispersion, $D_m$, of the optical fiber composite;

(b) producing an optical fiber composite by splicing the second optical fiber, having the length $L_2$, to one end of the first optical fiber and splicing the third optical fiber to the free end of the second optical fiber;

(c) forming an optical fiber cable by bundling together a plurality of the optical fiber composites; and (d) cutting off a length of optical fiber from at least one free end of the first and third optical fibers of each of the optical fiber composites in the optical fiber cable so that the total length of the optical fiber composite can be adjusted to the designed length, $L_t$, with the third optical fiber being shorter than the first optical fiber.

The present invention is further explained below by referring to the accompanying drawings. The drawings are provided solely for the purpose of illustration and are not intended to limit the scope of the present invention.

BRIEF DESCRIPTION OF THE DRAWINGS

In the drawings:

FIGS. 1A to 1C are diagrams illustrating an embodiment of the optical fiber composite of the present invention, in which FIG. 1A shows the constitution of the optical fiber composite, FIG. 1B shows the distribution of the chromatic dispersion, and FIG. 1C shows the distribution of the effective core area;

FIGS. 2A to 2C are diagrams illustrating an embodiment of the method for producing the optical fiber composite of the present invention, in which FIG. 2A shows the second optical fiber to be included in the composite, FIG. 2B shows an as-spliced state of the first, second, and third optical fibers that constitute the composite, and FIG. 2C shows the optical fiber composite;

FIGS. 3A to 3D are diagrams illustrating an embodiment of the method for producing the optical fiber cable of the present invention, in which FIG. 3A shows the second optical fiber to be included in an optical fiber composite, FIG. 3B shows an optical fiber composite to be included in the cable, FIG. 3C shows the optical fiber cable immediately after a plurality of optical fiber composites are bundled together, and FIG. 3D shows the optical fiber cable immediately after the excess lengths are cut off;

FIGS. 5A to 5D are diagrams illustrating a method for producing a conventional optical fiber cable, in which FIG. 5A shows an optical fiber composite before stranding, FIG. 5B shows the stranded optical fiber composites, FIG. 5C shows the composites after the welding of a water-pressure-resistant copper tube, and FIG. 5D shows the optical fiber cable after the extrusion of a protective covering.

DETAILED DESCRIPTION OF THE INVENTION

Figure 1A:
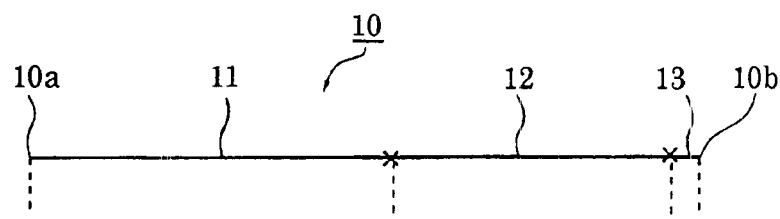

Embodiments of the present invention are explained below by referring to the accompanying drawings. In the drawings, the same member bears the same sign to avoid duplicated explanation. The ratios of the dimensions in the drawings do not necessarily coincide with the explanation.

Figure 1B:
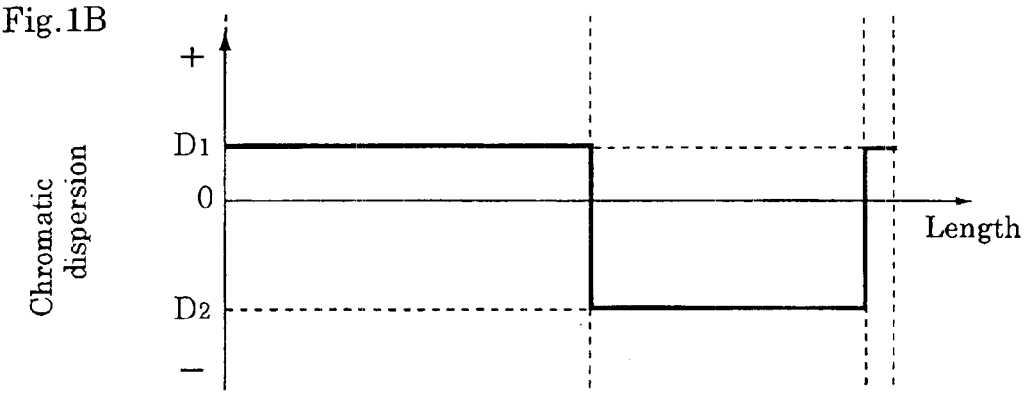
Figure 1C:
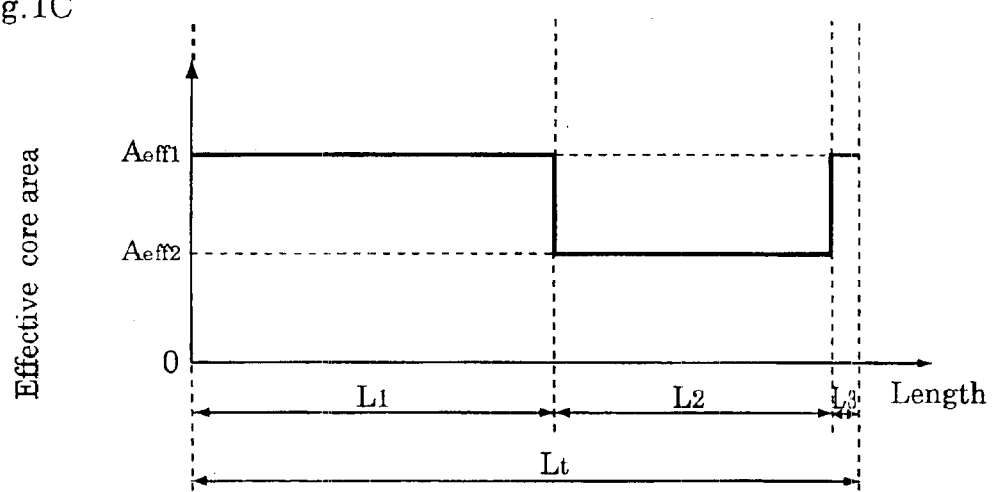

The constitution of the optical fiber composite of an embodiment is explained below. FIGS. 1A to 1C are diagrams illustrating an embodiment of the optical fiber composite of the present invention. FIG. 1A shows the constitution of the optical fiber composite, FIG. 1B shows the distribution of the chromatic dispersion, and FIG. 1C shows the distribution of the effective core area. An optical fiber composite 10 is produced by fusion-splicing a first optical fiber 11, a second optical fiber 12, and a third optical fiber 13 in this order from an end 10$a$ to the other end 10$b$.

The first optical fiber 11 has a chromatic dispersion of $D_1$ at the wavelength of a signal-carrying lightwave, for example, 1.55 $\mu$m, has an effective core area of $A_{\textit{eff}1}$, and has a length of $L_1$. The second optical fiber 12 has a chromatic dispersion of $D_2$ at the wavelength of the signal-carrying lightwave, has an effective core area of $A_{\textit{eff}2}$, and has a length of $L_2$. The third optical fiber 13 has the same chromatic dispersion and effective core area as the first optical fiber 11 and has a length of $L_3$. These parameters have the relationships shown by the following expressions:

$$D_2 < 0 < D_1 \tag{1a}$$

$$|D_2| > |D_1| \tag{1b}$$

$$A_{\textit{eff}2} < A_{\textit{eff}1} \tag{1c, and}$$

$$L_3 < L_1 \tag{1d}$$

The total length, $L_t$, of the optical fiber composite 10 is expressed in equation (2).

$$L_t = L_1 + L_2 + L_3 \tag{2}$$

The mean chromatic dispersion, $D_m$, of the entire optical fiber composite 10 at the wavelength of the signal-carrying lightwave is expressed in equation (3).

$$D_m = \frac{D_1(L_1 + L_3) + D_2 L_2}{L_t}. \tag{3}$$

When the optical fiber composite 10 is used for a submarine optical fiber cable, the composite is designed to have a length, $L_t$, of 50 km or so and to have an absolute value of mean chromatic dispersion, $D_m$, as small as, for example, 2 ps/nm/km. In the composite, the optical fibers 11 to 13 are designed so that their respective lengths $L_1$ to $L_3$ can satisfy equations (2) and (3) above.

It is desirable that the length, $L_1$, of the first optical fiber 11 and the length, $L_3$, of the third optical fiber 13 have a relationship shown in expression (4), more desirably expression (5).

$$\frac{L_3}{L_1} \leq 0.1. \tag{4}$$

$$\frac{L_3}{L_1} \leq 0.05. \tag{5}$$

It is desirable that the third optical fiber have a length, $L_3$, shown in expression (6).

$$L_3 \leq 1 \text{ km} \tag{6}$$

Figure 2A:
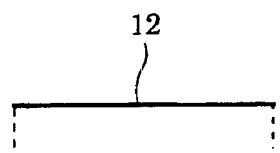
Figure 2B:
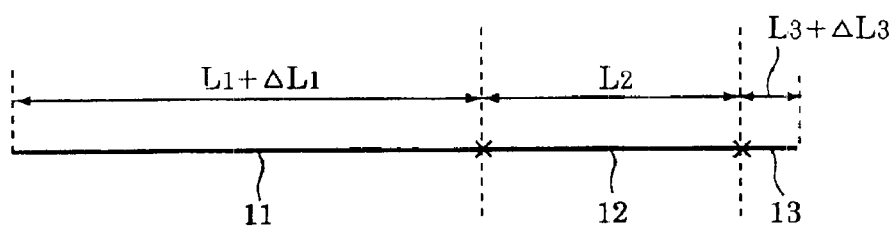
Figure 2C:
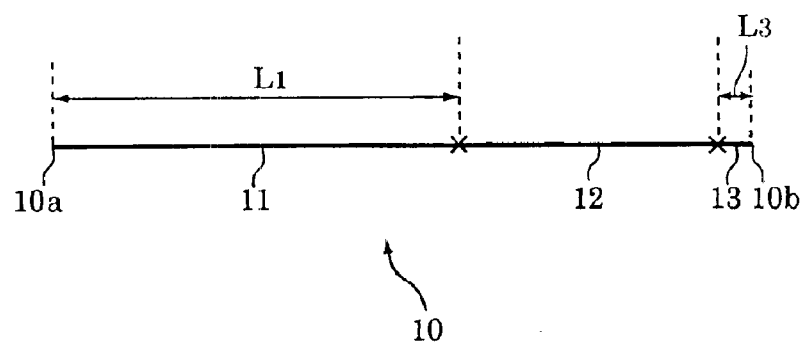

A method for producing the optical fiber composite 10 of the embodiment is explained below. FIGS. 2A to 2C are diagrams illustrating an embodiment of the method for producing the optical fiber composite of the present invention. FIG. 2A shows the second optical fiber to be included in the composite, FIG. 2B shows an as-spliced state of the first, second, and third optical fibers that constitute the composite, and FIG. 2C shows the optical fiber composite. First the chromatic dispersion, $D_1$, of the first and third optical fibers to be included in the optical fiber composite 10 is determined. The chromatic dispersion, $D_2$, of the second optical fiber to be included in the composite is similarly determined. The designed length, $L_t$, and the designed mean chromatic dispersion, $D_m$, of the optical fiber composite 10 are also determined. The length, $L_2$, of the second optical fiber is determined in accordance with equations (2) and (3) using the chromatic dispersions $D_1$ and $D_2$, the designed length $L_t$, and the designed mean chromatic dispersion $D_m$ (see FIG. 2A).

The second optical fiber 12, having a length of $L_2$, is provided. The first optical fiber 11, having a length of $(L_1+\Delta L_1)$, is spliced to one end of the second optical fiber 12. The third optical fiber 13, having a length of $(L_3+\Delta L_3)$, is spliced to the other end of the second optical fiber 12 (see FIG. 2B). In the above description, the lengths $L_1$ and $L_3$ satisfy equation (2), and each of the lengths $\Delta L_1$ and $\Delta L_3$ is zero or more.

A length of optical fiber is cut off from at least one free end of the first optical fiber 11 and the third optical fiber 13. In the case of FIG. 2C, both free ends are cut, so that the completed optical fiber composite 10 has the first optical fiber 11 with a length of $L_1$ and the third optical fiber 13 with a length of $L_3$. This process produces the optical fiber composite 10 that has a designed length of $L_t$, that has the third optical fiber 13 whose length, $L_3$, is shorter than the length, $L_1$, of the first optical fiber 11, and that has a designed mean chromatic dispersion of $D_m$.

In this production method of the optical fiber composite 10, the cutting off of a length of optical fiber from at least one end of the composite does not change the length, $L_2$, of the second optical fiber 12. After this cutting process, the length of the composite becomes the designed length, $L_t$, and the mean chromatic dispersion of the composite becomes the designed mean chromatic dispersion, $D_m$. In this cutting process, slight variations in the cut-off length of the first optical fiber 11 and the third optical fiber 13 can be tolerated.

A signal-carrying lightwave propagates from an end, 10a, to the other end, 10b, of the optical fiber composite 10. A signal-carrying lightwave having relatively large power propagates in the first optical fiber 11. Because the first optical fiber 11 has an effective core area larger than that of the second optical fiber 12 in the downstream, nonlinear optical phenomena seldom occur. The first optical fiber 11 has a relatively long length, $L_1$, so that the lightwave decreases its power during the propagation through the first optical fiber 11. Because the lightwave with decreased power propagates through the second optical fiber 12, the degradation in transmission quality due to generation of nonlinear optical phenomena can be suppressed.

From the viewpoint of the above-described phenomena, the foregoing degradation can be suppressed more effectively when the ratio of the length, $L_3$, of the third optical fiber 13 to the length, $L_1$, of the first optical fiber 11 ($L_3/L_1$) is 0.1 or less, more desirably 0.03 or less. In addition, when the third optical fiber 13 has a length, $L_3$, of 1 km or less, the foregoing degradation can also be suppressed more effectively.

It is desirable that the optical fiber composite 10 have a second chromatic dispersion, $D_2$, whose absolute value is larger than that of a first chromatic dispersion, $D_1$. In this case, even when the composite has a total length slightly different from the designed length, $L_t$, the composite can maintain a mean chromatic dispersion comparable to the designed value, $D_m$.

It is desirable that the optical fiber composite of the present invention be composed of the first and third optical fibers that are single-mode optical fibers (SMFs) having a chromatic dispersion of +17 to +20 ps/nm/km or so at a wavelength of 1.55 μm and the second optical fiber that is a dispersion-compensating optical fiber (DCF) having a negative chromatic dispersion with an absolute value of several tens of ps/nm/km at a wavelength of 1.55 μm. As an example illustrating the utility of the invention the third optical fiber has a chromatic dispersion, wherein the difference between the chromatic dispersion and the first chromatic dispersion is not more than 3 ps/nm/km, i.e. the difference between the chromatic dispersion range of +17 to +20 ps/nm/km.

Figure 3A:
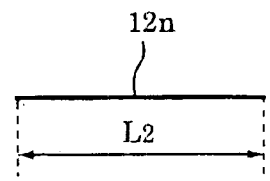
Figure 3B:
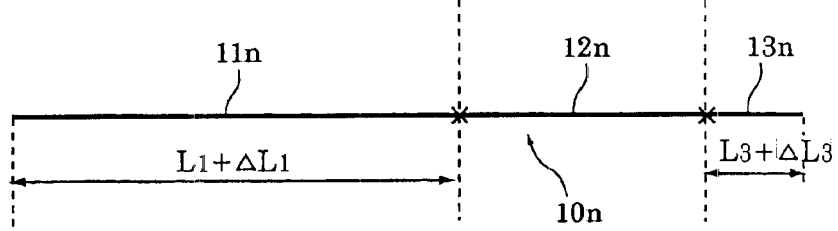
Figure 3C:
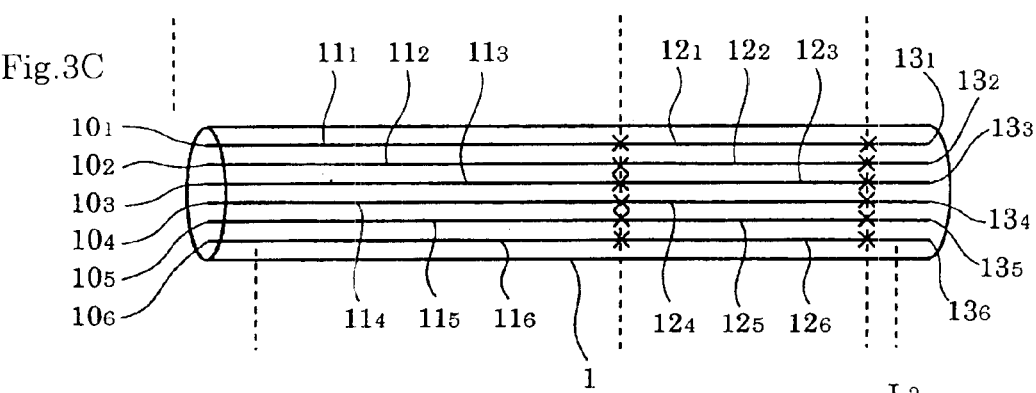
Figure 3D:
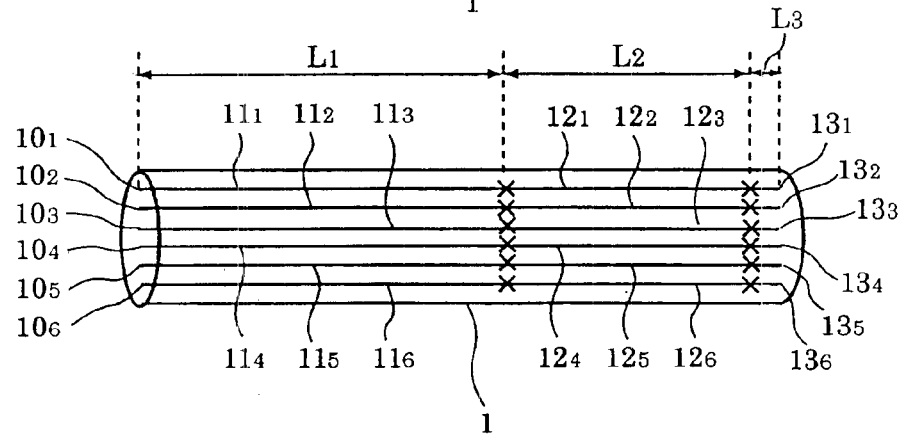
Figure 4A:
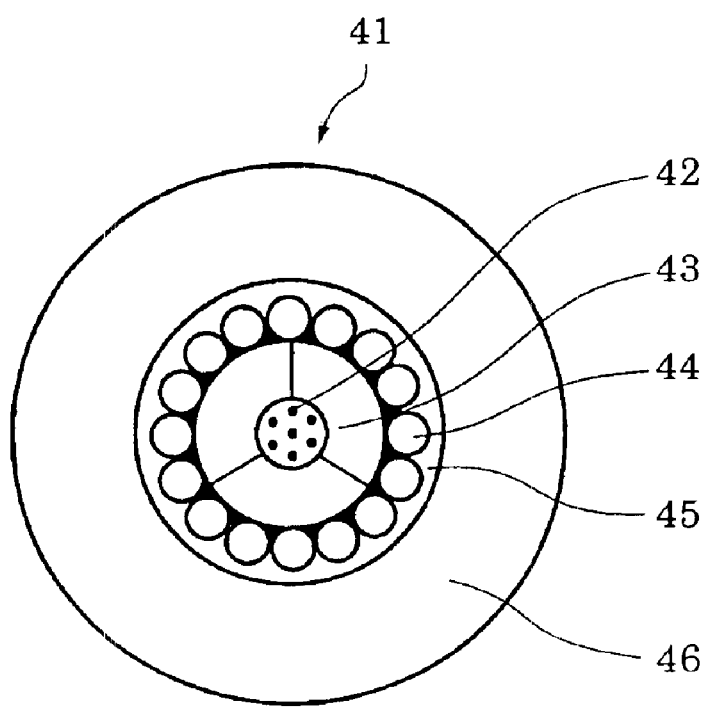
FIG. 4A is a cross-sectional view of a submarine optical fiber cable.
Figure 4B:
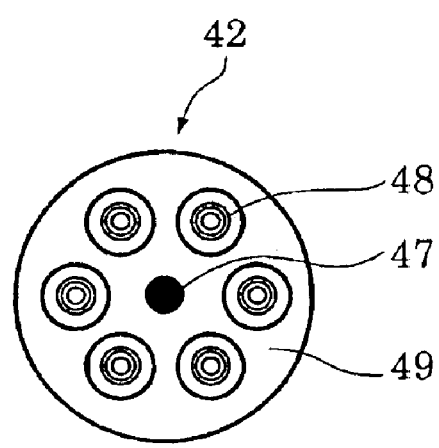
FIG. 4B is a cross-sectional view of an optical fiber unit included in the submarine optical fiber cable.

An embodiment of the optical fiber cable of the present invention and an embodiment of the method for producing the cable are explained below. FIG. 4A is a cross-sectional view of a submarine optical fiber cable, which is an embodiment of the optical fiber cable of the present invention. FIG. 4B is a cross-sectional view of an optical fiber unit included in the submarine optical fiber cable. FIGS. 3A to 3D are diagrams illustrating an embodiment of the method for producing the optical fiber cable of the present invention. FIG. 3A shows the second optical fiber to be included in an optical fiber composite, FIG. 3B shows an optical fiber composite to be included in the optical fiber cable, FIG. 3C shows the optical fiber cable immediately after a plurality of optical fiber composites are bundled together, and FIG. 3D shows the optical fiber cable immediately after the excess lengths are cut off.

As shown in FIG. 3C, an optical fiber cable 1 is a bundle of six optical fiber composites, $10_1$ to $10_6$. As shown in FIG. 4A, a submarine optical fiber cable 41 comprises an optical fiber unit 42 including a plurality of optical fiber composites, a three-segmental metal tube 43, high-tensile steel wires 44, a copper tube 45, and a protective covering 46. These components are provided in this order from the inside. As shown in FIG. 4B, the optical fiber unit 42 comprises a central steel wire 47, a plurality of optical fiber composites 48 placed around the central steel wire 47, and a plastic buffer 49. The plastic buffer 49 fills the interstice between the composites and covers the composites so that the composites can be fixed at their places. As shown in FIGS. 3B and 3C, an optical fiber composite $10_n$ (the suffix "n" is an arbitrary integer from 1 to 6; hereinafter the same is applied) comprises the first optical fiber $11_n$, the second optical fiber $12_n$, and the third optical fiber $13_n$. These fibers are spliced in this order. An optical fiber composite $10_n$ is the above-described optical fiber composite of the present invention.

The optical fiber cable 1 shown in FIG. 3C is produced by the steps described below. The chromatic dispersion, $D_1$, of the first optical fiber 11 and the third optical fiber $13_n$ for an optical fiber composite $10_n$ to be included in the optical fiber cable 1 is determined. Similarly, the chromatic dispersion, $D_2$, of the second optical fiber $12_n$ is determined. The designed length, $L_t$, and the designed mean chromatic dispersion, $D_m$, of the optical fiber composite $10_n$ are determined. The length, $L_2$, of the second optical fiber $12_n$ is determined in accordance with equations (2) and (3) using the chromatic dispersions $D_1$ and $D_2$, the designed length $L_t$, and the designed mean chromatic dispersion $D_m$ (see FIG. 3A).

The second optical fiber $12_n$, having a length of $L_2$, is provided. The first optical fiber $11_n$, having a length of ($L_1+\Delta L_1$), is fusion-spliced to one end of the second optical fiber $12_n$. The third optical fiber $13_n$, having a length of ($L_3+\Delta L_3$), is fusion-spliced to the other end of the second optical fiber $12_n$ (see FIG. 3B). The fusion-spliced portion is coated with plastic such that the portion has the same diameter as the other portions. In the above description, the lengths $L_1$ and $L_3$ satisfy equation (2), and each of the lengths $\Delta L_1$ and $\Delta L_3$ is zero or more.

The optical fiber composites $10_1$ to $10_6$ are bundled together to produce the optical fiber cable 1 (see FIG. 3C). During this process, a length of optical fiber is cut off from at least one free end of the first optical fiber $11_n$ and the third optical fiber $13_n$ of each of the optical fiber composites $10_1$ to $10_6$. The optical fiber cable 1 is wound on a reel for shipment. During the installation work, a length of optical fiber is cut off from at least one free end of the first optical fiber $11_n$ and the third optical fiber $13_n$. In the case of FIG. 3D, both free ends are cut, so that the completed optical fiber cable 1 has the first optical fiber $11_n$ with a length of $L_1$ and the third optical fiber $13_n$ with a length of $L_3$. This process produces the optical fiber composite $10_n$ that has a designed length of $L_t$, that has the third optical fiber $13_n$ whose length, $L_3$, is shorter than the length, $L_1$, of the first optical fiber $11_n$, and that has a designed mean chromatic dispersion of $D_m$.

In this production method of the optical fiber composite $10_n$ included in the optical fiber cable 1, the cutting off of a length of optical fiber from at least one end of the composite does not change the length, $L_2$, of the second optical fiber $12_n$. After this cutting process, the length of the optical fiber cable 1 becomes the designed length, $L_t$, and the mean chromatic dispersion of the optical fiber composite $10_n$ becomes the designed mean chromatic dispersion, $D_m$. In this cutting process, slight variations in the cut-off length of the first optical fiber $11_n$ and the third optical fiber $13_n$ can be tolerated.

Figure 3E:
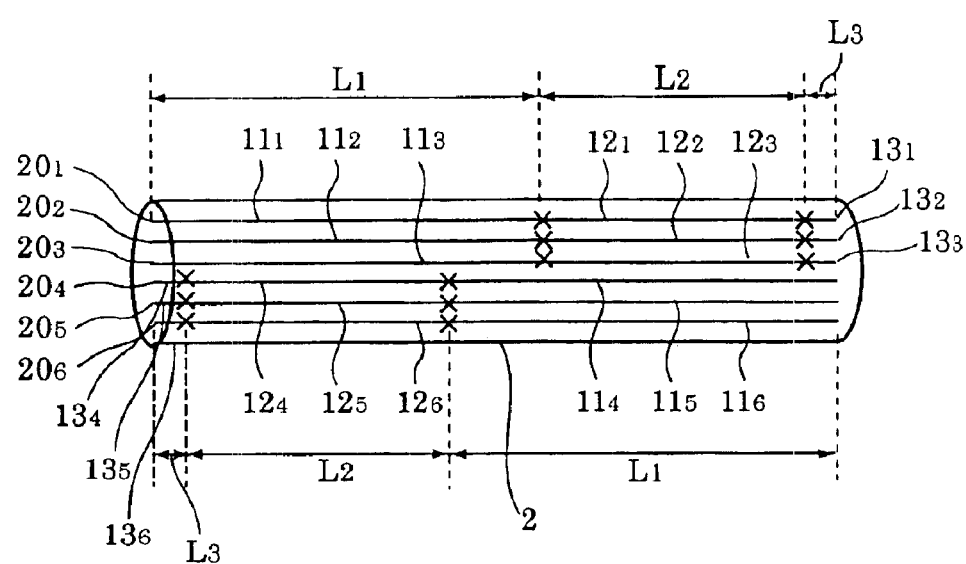
FIG. 3E shows another embodiment of the optical fiber cable of the present invention.

FIG. 3E shows another embodiment of the optical fiber cable of the present invention. The optical fiber cable 2 is a bundle of six optical fiber composites. In three optical fiber composites, $20_1$ to $20_3$, the first optical fiber $11_n$, the second optical fiber $12_n$, and the third optical fiber $13_n$ are spliced in this order. In the other three optical fiber composites, $20_4$ to $20_6$, the third optical fiber $13_n$, the second optical fiber $12_n$, and the first optical fiber $11_n$ are spliced in this order.

EXAMPLE 1

The first optical fiber 11 and the third optical fiber 13 are SMFs having a chromatic dispersion of 17 ps/nm/km at a wavelength of 1.55 μm. The second optical fiber 12 is a DCF having a chromatic dispersion of −40 ps/nm/km at a wavelength of 1.55 μm. The optical fiber composite 10 has a designed length of 50 km and a designed mean chromatic dispersion of −2 ps/nm/km at a wavelength of 1.55 μm. The length, $L_2$, of the second optical fiber 12 is determined to be 17 km based on the foregoing values for the individual parameters. The lengths of the first optical fiber 11 and the third optical fiber 13 are determined to be 32.5 km and 0.5 km, respectively.

EXAMPLE 2

The first optical fiber 11 and the third optical fiber 13 are pure-silica-core optical fibers having a chromatic dispersion of 20 ps/nm/km at a wavelength of 1.55 μm. The second optical fiber 12 is a DCF having a chromatic dispersion of −45 ps/nm/km at a wavelength of 1.55 μm. The optical fiber composite 10 has a designed length of 50 km and a designed mean chromatic dispersion of −2 ps/nm/km at a wavelength of 1.55 μm. The length, $L_2$, of the second optical fiber 12 is determined to be 17 km based on the foregoing values for the individual parameters. The lengths of the first optical fiber 11 and the third optical fiber 13 are determined to be 32 km and 1 km, respectively.

COMPARATIVE EXAMPLE

FIGS. 5A to 5D are diagrams illustrating a method for producing a conventional optical fiber cable. FIG. 5A shows an optical fiber composite before stranding, FIG. 5B shows the stranded optical fiber composites, FIG. 5C shows the composites after the welding of a water-pressure-resistant copper tube, and FIG. 5D shows the optical fiber cable after the extrusion of a protective covering. The optical fiber cable has the cross-sectional structure shown in FIGS. 4A and 4B. Each of the optical fiber composites 48 comprises an SMF having a chromatic dispersion of 20 ps/nm/km and a DCF having a chromatic dispersion of −45 ps/nm/km.

As shown in FIG. 5B, when the stranding of a plurality of optical fiber composites 48 is completed, a 10-meter-long optical fiber is cut off from each free end of the SMFs and an 80-meter-long optical fiber is cut off from each free end of the DCFs. As shown in FIG. 5C, when the water-pressure-resistant copper tube is welded, a 90-meter-long optical fiber is cut off from each free end of the SMFs and a 350-meter-long optical fiber is cut off from each free end of the DCFs. As shown in FIG. 5D, when the protective covering is extruded, a 150-meter-long optical fiber is cut off from each free end of the SMFs and a 70-meter-long optical fiber is cut off from each free end of the DCFs. When the above process is finished, a total of 250 meters of optical fiber is cut off from each of the SMFs and the chromatic dispersion varies by the amount of 5 ps/nm. Similarly, a total of 500 meters of optical fiber is cut off from each of the DCFs and the chromatic dispersion varies by the amount of −22.5 ps/nm. As a result, the overall chromatic dispersion of each of the optical fiber composites in the completed optical fiber cable varies by an amount no less than −17.5 ps/nm.

If it is possible to predict the length of optical fiber to be cut off from both ends of an optical fiber composite, it is possible to design and produce an optical fiber composite to be included in an optical fiber cable by taking into account the amount of variation in overall chromatic dispersion, because the amount of variation corresponds to the cut-off length of optical fiber as described above. However, the cut-off length varies considerably according to the variation in the conditions of each stage in the production process of an optical fiber cable. Consequently, it is difficult to accurately predict the cut-off length of optical fiber during the production process of an optical fiber cable, which means that it is difficult to accurately predict the amount of variation in overall chromatic dispersion when the cable is completed.

Notwithstanding the above-described difficulty, a submarine optical fiber cable is required to comprise optical fiber composites that have an overall chromatic dispersion coinciding with the designed value within an error of several of ps/nm on the average. However, as explained in the above example, overall chromatic dispersion can vary as much as several tens of ps/nm due to cutting-off of optical fibers. Because the amount of variation in overall chromatic dispersion depends on the cut-off length of optical fibers, it is difficult to produce an optical fiber composite whose overall chromatic dispersion coincides with the designed value within an error of several of ps/nm. Such a problem is particularly serious in the case of a submarine optical fiber cable, because a submarine cable constitutes an entire repeater section with one length. (Of course, land cables have a similar problem). In the above explanation, the term "a repeater section" is used to mean any of the following three sections: a section from a transmitting station to a repeater station including an optical amplifier and other equipment, a section from a repeater station to the next repeater station, and a section from a repeater station to a receiving station.

As can be seen from the explanation in Comparative Example, the conventional optical fiber transmission lines stated in the first and second literatures cannot have the intended mean transmission property when a length of optical fiber is cut off from the end portion. Even when they are designed to have a desired mean transmission property as a whole, the cutting-off of a length of optical fiber from the end portion inhibits this intention. In particular, when an optical fiber having a large absolute value in chromatic dispersion is used at an end portion of an optical fiber transmission line as stated in the first and second literatures, the cutting-off of a length of optical fiber from the end portion causes a considerable variation in the overall chromatic dispersion of the optical fiber transmission line.

The present invention is not limited by the above-explained embodiments; several variants can be implemented. For example, in the optical fiber cable 1 in one of the embodiments (see FIGS. 3C and 3D), all the first optical fibers, $11_1$ to $11_6$, and the third optical fibers, $13_1$ to $13_6$, have the same chromatic dispersion, $D_1$, at the wavelength of a signal-carrying lightwave, and all the second optical fibers, $12_1$ to $12_6$, have the same chromatic dispersion, $D_2$, at the wavelength of the signal-carrying lightwave and have the same length, $L_2$. However, it is sufficient for the first optical fiber, $11_n$, and the third optical fiber, $13_n$, to have the same chromatic dispersion, $D_1$, for each value of the parameter "n." The chromatic dispersions $D_{1\ and\ D2}$ can vary with the parameter "n." Similarly, the length, $L_2$, of the second optical fiber $12_n$ can vary with the parameter "n."

What is claimed is:

1. An optical fiber composite comprising:
   (a) a first optical fiber having a first chromatic dispersion, $D_1$, at the wavelength of a signal-carrying lightwave;
   (b) a second optical fiber that:
      (b1) has a second chromatic dispersion, $D_2$, at the wavelength of the signal-carrying lightwave, the second chromatic dispersion having the sign opposite to that of $D_1$; and
      (b2) is spliced to one end of the first optical fiber; and
   (c) a third optical fiber that:
      (c1) has a chromatic dispersion, wherein the difference between the chromatic dispersion and the first chromatic dispersion being not more than 3 ps/mn/km;
      (c2) is shorter than the first optical fiber; and
      (c3) is spliced to the free end of the second optical fiber.

2. An optical fiber composite as defined in claim 1, wherein:
   (a) the first optical fiber has a length of $L_1$;
   (b) the third optical fiber has a length of $L_3$; and
   (c) the ratio $L_3/L_1$ is at most 0.1.

3. An optical fiber composite as defined in claim 1, wherein the length, $L_3$, of the third optical fiber is at most 1 km.

4. An optical fiber composite as defined in claim 1, wherein the absolute value of the second chromatic dispersion, $D_2$, is larger than that of the first chromatic dispersion, $D_1$.

5. A method for producing an optical fiber composite, the method comprising the steps of:
   (a) providing a first optical fiber having a first chromatic dispersion, $D_1$, at the wavelength of a signal-carrying lightwave;
   (b) providing a second optical fiber having a second chromatic dispersion, $D_2$, at the wavelength of the signal-carrying lightwave, the second chromatic dispersion having the sign opposite to that of $D_1$;
   (c) providing a third optical fiber having a chromatic dispersion, wherein the difference between the chromatic dispersion and the first chromatic dispersion being not more than 3 ps/nm/kin;
   (d) designing the total length, $L_t$, of the optical fiber composite;
   (e) designing the mean chromatic dispersion, $D_m$, of the optical fiber composite;
   (f) determining the length, $L_2$, of the second optical fiber by using the parameters $D_1$, $D_2$, $L_t$, and $D_m$;
   (g) splicing the second optical fiber to one end of the first optical fiber;
   (h) splicing the third optical fiber to the free end of the second optical fiber;
   (i) cutting off a length of optical fiber from at least one free end of the first and third optical fibers so that the total length of the optical fiber composite can be adjusted to the designed length, $L_t$, with the third optical fiber being shorter than the first optical fiber.

6. An optical fiber cable comprising a plurality of optical fiber composites, each of which composites comprises:
   (a) a first optical fiber having a first chromatic dispersion, $D_1$, at the wavelength of a signal-carrying lightwave;
   (b) a second optical fiber that:
      (b1) has a second chromatic dispersion, $D_2$, at the wavelength of the signal-carrying lightwave, the second chromatic dispersion having the sign opposite to that of $D_1$; and
      (b2) is fusion-spliced to one end of the first optical fiber; and
   (c) a third optical fiber that:
      (c1) has a chromatic dispersion, wherein the difference between the chromatic dispersion and the first chromatic dispersion being not more than 3 ps/nm/km;
      (c2) is shorter than the first optical fiber; and
      (c3) is fusion-spliced to the free end of the second optical fiber.

7. An optical-fiber cable as defined in claim 6, wherein the fusion-spliced portions between the first optical fiber and the second optical fiber and between the second optical fiber and the third optical fiber are coated with plastic such that the fusion-spliced portions have the same diameter as the other portions of the optical fiber.

8. A method for producing an optical fiber cable comprising a plurality of optical fiber composites, the method comprising the steps of:
   (a) providing a first optical fiber having a first chromatic dispersion, $D_1$, at the wavelength of a signal-carrying lightwave;
   (b) providing a second optical fiber having a second chromatic dispersion, $D_2$, at the wavelength of the signal-carrying lightwave, the second chromatic dispersion having the sign opposite to that of $D_1$;

(c) providing a third optical fiber having a chromatic dispersion, wherein the difference between the chromatic dispersion and the first chromatic dispersion being not more than 3 ps/nm/km;

(d) designing the total length, $L_t$, of the optical fiber composite;

(e) designing the mean chromatic dispersion, $D_m$, of the optical fiber composite;

(f) determining the length, $L_2$, of the second optical fiber by using the parameters $D_1$, $D_2$, $L_t$, and $D_m$;

(g) forming the optical fiber composite by splicing the second optical fiber to one end of the first optical fiber and splicing the third optical fiber to the free end of the second optical fiber;

(h) forming the optical fiber cable by bundling together a plurality of the optical fiber composites; and (i) cutting off a length of optical fiber from at least one free end of the first and third optical fibers of each of the optical fiber composites in the optical fiber cable so that the total length of the optical fiber composite can be adjusted to the designed length, $L_t$, with the third optical fiber being shorter than the first optical fiber.

* * * * *